(12) United States Patent
Tsang et al.

(10) Patent No.: US 10,913,393 B2
(45) Date of Patent: Feb. 9, 2021

(54) DOOR OPENING CLEARANCE DETECTION

(71) Applicant: Byton Limited, Hong Kong (HK)

(72) Inventors: Man Chun Tsang, Daly City, CA (US);
Srini Gowda, Solihull (GB);
Soumendu Chanda, San Jose, CA
(US); Pradip Mukherjee, Fremont, CA
(US); Dirk Abendroth, Mountain View,
CA (US)

(73) Assignee: Byton Limited, Hong Kong (HK)

( * ) Notice: Subject to any disclaimer, the term of this patent is extended or adjusted under 35 U.S.C. 154(b) by 95 days.

(21) Appl. No.: 15/957,837

(22) Filed: Apr. 19, 2018

(65) Prior Publication Data
US 2019/0322215 A1    Oct. 24, 2019

(51) Int. Cl.
| | |
|---|---|
| *G06K 9/00* | (2006.01) |
| *B60Q 9/00* | (2006.01) |
| *B60J 5/04* | (2006.01) |
| *B60R 1/06* | (2006.01) |
| *B60R 1/12* | (2006.01) |

(52) U.S. Cl.
CPC .............. *B60Q 9/008* (2013.01); *B60J 5/04*
(2013.01); *B60R 1/06* (2013.01); *B60R 1/12*
(2013.01); *B60R 2001/1223* (2013.01)

(58) Field of Classification Search
CPC ... B60Q 9/008; B60J 5/04; B60R 1/06; B60R 1/12; B60R 2001/1223
USPC .......................................................... 382/103
See application file for complete search history.

(56) References Cited

U.S. PATENT DOCUMENTS

| | | | | |
|---|---|---|---|---|
| 2004/0046647 | A1* | 3/2004 | Reeves | B60Q 9/006 340/435 |
| 2013/0055809 | A1* | 3/2013 | Kawashima | B60R 19/483 73/431 |
| 2013/0085975 | A1* | 4/2013 | Wellhoefer | B60R 21/0134 706/46 |
| 2014/0025285 | A1* | 1/2014 | Trombley | G01S 5/0072 701/301 |
| 2017/0306684 | A1* | 10/2017 | Baruco | E05F 15/73 |

* cited by examiner

*Primary Examiner* — Stephen P Coleman
(74) *Attorney, Agent, or Firm* — Womble Bond Dickenson (US) LLP (57) ABSTRACT

Embodiments are described of an apparatus including a computer with a user interface. One or more door clearance detection (DCD) sensors are communicatively coupled to the computer and adapted to be mounted to an exterior of a vehicle door. Each vehicle door has a door impact zone such that an object in the impact zone would be struck by the door if opened, and each DCD sensor has a field of view and a range that establish a detection zone within which the DCD sensor can collect data. Each detection zone includes at least the corresponding door impact zone. Logic stored in the memory or storage includes instructions that, when executed by the processor, cause the processor to receive data from the one or more DCD sensors; determine whether there are objects in the corresponding door impact zone; and warn vehicle occupants if there are objects in the impact zones.

27 Claims, 4 Drawing Sheets

DOOR OPENING CLEARANCE DETECTION

TECHNICAL FIELD

The disclosed embodiments relate generally to vehicles and in particular, but not exclusively, to a vehicle door clearance detection/door open warning (DCD/DOW) system.

BACKGROUND

Most major vehicle accidents occur when a vehicle is moving at relatively high speeds, but more minor accidents can also occur when a vehicle is moving at very slow speeds or is stationary. For instance, when a vehicle is stopped accidents can occur when occupants open their doors unsafely. The door can impact or collide with objects that are within a door clearance or impact zone. In some cases these are objects that an occupant might be unable to see while seated in the vehicle because the objects are too low and the occupant's view is blocked by the door, because the objects are not in a position where the occupant expects them, or because the occupant is distracted or otherwise fails to perceive them. Examples include other vehicles, street sign poles, humans, fire hydrants, mailboxes, or other types of objects.

These low-speed or stationary accidents usually don't result in injury to occupants of the vehicle, but opening a vehicle door into an object can result in vehicle damage such as door dings, broken or damaged trim, broken or damaged windows, etc. Property damage can also result to objects hit by an opening vehicle door, such as door dings in a neighboring car. In rare cases personal injury can result, for instance if an opening door hits a pedestrian or a passing or stationary cyclist.

SUMMARY

Embodiments are described of an apparatus include a computer coupled to a user interface. One or more door clearance detection (DCD) sensors are communicatively coupled to the computer and adapted to be mounted to an exterior of a corresponding vehicle door. Each vehicle door has a corresponding door impact zone such that an object within the door impact zone would be struck by the vehicle door if opened, and each DCD sensor has a field of view and a range that establish a detection zone within which the DCD sensor can collect data. Each detection zone includes at least the corresponding door impact zone. Logic stored in the memory or storage includes instructions that, when executed by the processor, cause the processor to receive data from the one or more DCD sensors; determine whether there are any objects in the corresponding door impact zone; and warn an occupant of the vehicle if there are any objects in the door impact zones.

Embodiments of a system include a vehicle with at least a driver door and a front passenger door. A vehicle door opening warning apparatus includes a computer including at least a processor, memory, and storage. A user interface is communicatively coupled to the computer and a pair of door clearance detection (DCD) sensors communicatively coupled to the computer. One DCD sensor is mounted to an exterior of the driver door and the other DCD sensor is mounted to an exterior of the front passenger door. The driver door and the front passenger door each have a door impact zone, wherein at least one object within the door impact zone would be struck by the corresponding door if opened. Each DCD sensor has a field of view and a range, wherein for each DCD sensor the field of view and the range establish a detection zone within which the DCD sensor can collect data, and wherein each detection zone includes at least the door impact zone of its corresponding door. Logic comprising instructions is stored in the memory or storage. The instructions, when executed by the processor, cause the processor to receive data from the pair of DCD sensors; determine, based on the received data, whether there are any objects in the door impact zone of the driver door or the door impact zone of the front passenger door; and warn an occupant of the vehicle via the user interface if it is determined that there are any objects in either door impact zone.

Embodiments of a method include receiving data from one or more door clearance detection (DCD) sensors mounted on a vehicle door, each DCD sensor having a field of view and a range that establish a detection zone within which the DCD sensor can collect data. The method determines, based on the received data, whether there are any objects in one or more door impact zones corresponding to each vehicle door on which a DCD sensor is mounted, wherein the door impact zone is a zone within which at least one object would be struck by the vehicle door if opened and wherein each detection zone includes at least the corresponding door impact zone. The method warns an occupant of the vehicle if it is determined that there are any objects in the one or more door impact zones.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Embodiments are disclosed of a door collision detection/door open warning (DCD/DOW) system. The system includes one or more door collision detection (DCD) cameras attached to a corresponding vehicle door. In circumstances where a door opening is imminent, the DCD cameras are used to detect objects that their corresponding doors might hit if opened. If such objects are detected, the occupants of the vehicle can be warned so that they don't open the door.

Figure 1A:
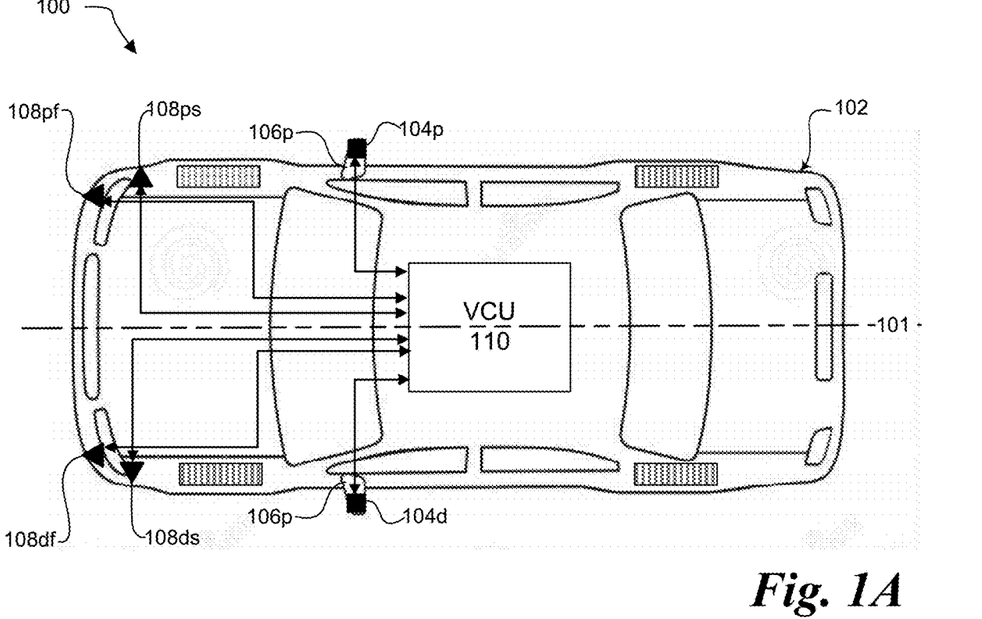
FIG. 1A is a plan view of an embodiment of a vehicle door clearance detection/door open warning (DCD/DOW) system.
Figure 1B:
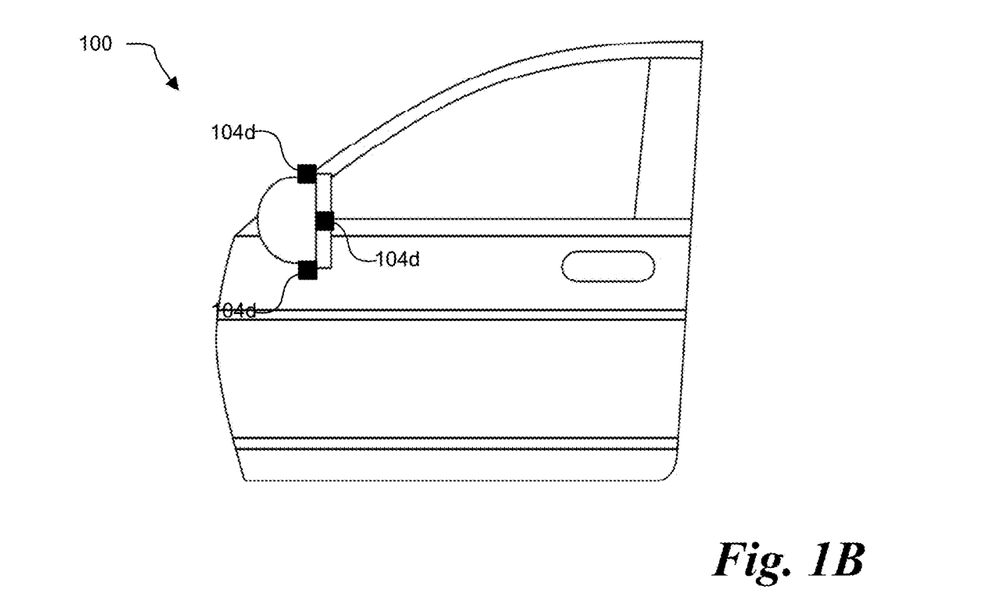
FIG. 1B is a side view of embodiments of the placement of DCD cameras on a vehicle door.

FIGS. 1A-1B together illustrate an embodiment of a door collision detection/door open warning (DCD/DOW) system 100. DCD/DOW system 100 is positioned on and in a vehicle 102 and includes a pair of door collision detection (DCD) cameras 104 communicatively coupled to a vehicle control unit (VCU) 110. Two pairs of sonar sensors 108 are positioned at the front corners of vehicle 102 and are also communicatively coupled to VCU 110. In the context of this application, that entities or devices are "communicatively coupled" means that they are coupled in such a way that data, commands, or other information can be exchanged, in one or both directions, between the two.

In the pair of DCD cameras 104, DCD camera 104d is positioned on the driver side mirror 106d of the vehicle and DCD camera 104p is positioned on the passenger side mirror 106d of vehicle 102. As shown in FIG. 1B, in different embodiments the DCD camera 104d can be in different positions, including on top of mirror 106d, on the bottom of mirror 106d, or on the end of mirror 106d. Although not shown, DCD camera 104p can be positioned in any of these positions on passenger side mirror 106p. In one embodiment DCD cameras 104d and 104p are regular cameras, but in other embodiments they can be stereoscopic cameras, time-of-flight cameras, or some other type of camera or other type of sensor. In some embodiments DCD cameras 104d and 104p are the same type of camera, but in other embodiments they need not be the same, but can instead be different types of cameras.

Two pairs of sonar sensors 108 are positioned at or near the front corners of vehicle 102. The pair of sonar sensors on the driver side includes a forward-pointing sonar sensor 108df (i.e., pointing substantially parallel to vehicle axis 101) and a sideways-pointing sonar sensor 108ds (i.e., pointing substantially normal to vehicle axis 101). Similarly, the pair of sonar sensors on the passenger side includes a forward-pointing sonar sensor 108pf and a sideways-pointing sonar sensor 108ps. Each individual sonar sensor 108df, 108ds, 108pf, and 108ps, includes a sound transmitter to generate an acoustic signal and a sound receiver such as a microphone to receive the reflection of the acoustic signal generated by the sound transmitter, thus enabling each sonar sensor 108 to detect objects. In some embodiments of system 100 one or more of sonar sensors 108, up to and including all of them, can be omitted.

Other embodiments of system 100 need not be limited to cameras and sonar sensors, but can use other types of sensors in addition to, or instead of, the cameras and sonar sensors shown in the illustrated embodiment. For instance, in other embodiments radar, lidar, thermal infrared sensors (TIRS), or other types of sensors could be used to replace and/or supplement either or both of cameras 104 and sonar sensors 108.

Vehicle control unit (VCU) 110 is a controller including one or more microprocessors, memory, storage, and a communication interface with which it can communicate with other components such as cameras 104d and 104p, as well as sonar sensors 108df, 108ds, 108pf, and 108ps if present in system 100. VCU 110 is also communicatively coupled to a user interface (not shown in FIGS. 1A-1B, but see FIG. 3). VCU 110 can also include additional components such as a clock, a global positioning system (GPS), etc. In one embodiment VCU 110 is the vehicle's main computer, but in other embodiments it can be a component separate from the vehicle's main or primary computer.

Figure 2:
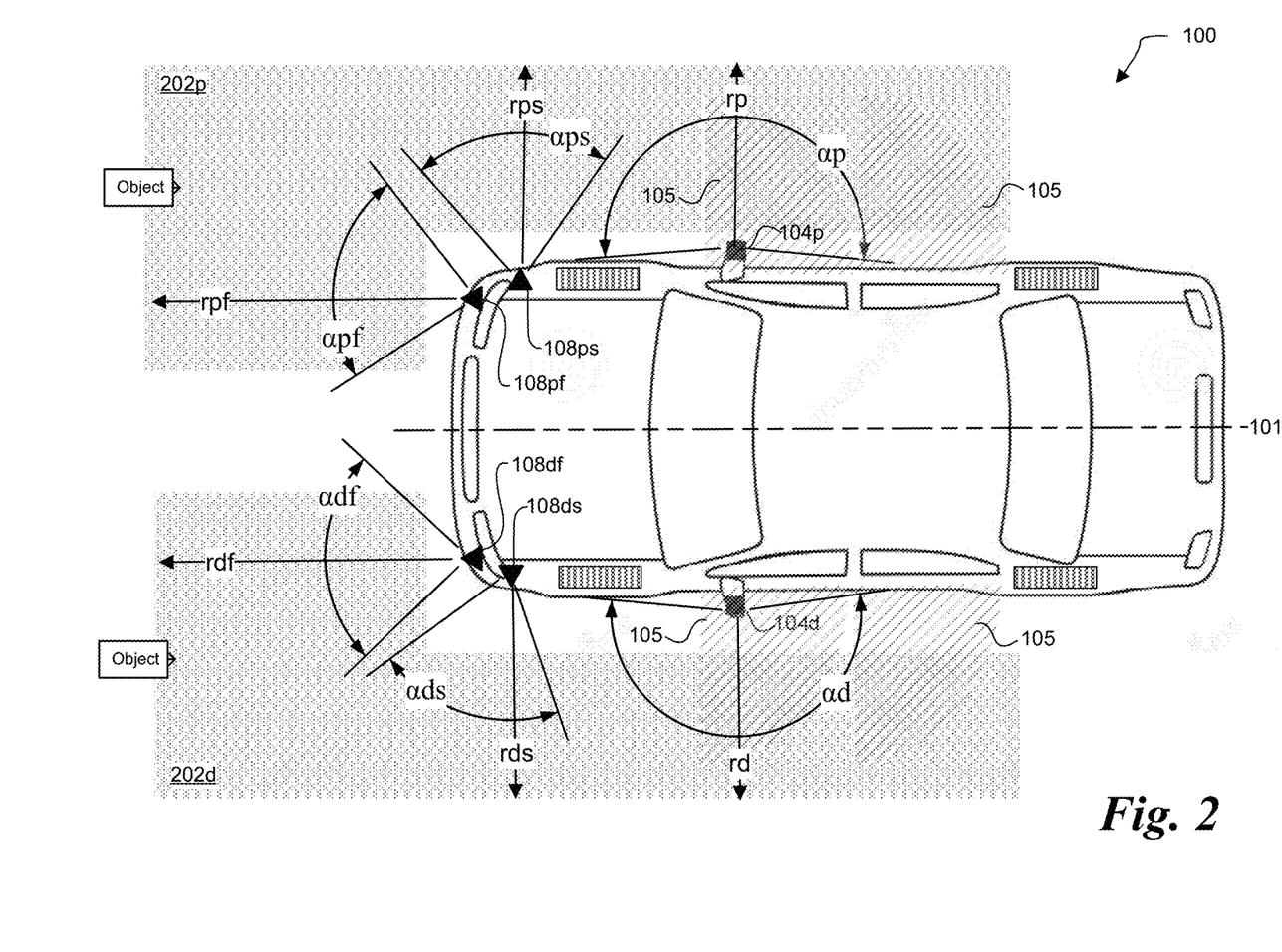
FIG. 2 is a plan view of a vehicle with an embodiment of DCD/DOW system, illustrating detection zones and door impact zones.

FIG. 2 illustrates embodiments of impact zones and detection zones for a vehicle 102 with an embodiment of a DCD/DOW system 100. In vehicle 102, each door has an impact zone 105; in an embodiment with a traditional vehicle door that is vertically hinged along the forward edge of the door, when viewed above its impact zone will be arc-shaped and centered at the door hinge. Other embodiments can, of course, have doors that operate differently than traditional vehicle doors, in which case the shape of the impact zone would change accordingly. In the illustrated embodiment vehicle 102 is a four-door passenger sedan, but in other embodiments vehicle 102 could be a different type of vehicle such as a pickup, sport utility vehicle, minivan, or truck, and in other embodiments it could have a different number of doors than shown, such as 2, 3, or 5 doors.

Each DCD camera has a field of view and a range: camera 104d has a field of view αd and range rd, and camera 104p has field of view αp and range rp. For each camera 104, its range and field of view establish a detection zone within which it can detect objects. In one embodiment DCD cameras 104 have fields of view αd and αp between about 45 degrees and 190 degrees, but in other embodiments the cameras can have smaller or larger fields of view. Similarly, in one embodiment DCD cameras 104d and 104p can have ranges rd and rp between 0 and about 1.5 m (i.e., between 0 and about 6 feet), but in other embodiments the cameras can have smaller or greater ranges.

Each sonar sensor 108 at the front of vehicle 102 has a field of view and a range: sonar sensor 108ps has a field of view αps and range rps; sonar sensor 108pf has field of view αpf and range rpf, sonar sensor 108df has field of view αdf and range rdf, and sonar sensor 108pf has field of view αds and range rds. As with cameras 104, for each sonar sensor 108 its field of view and its range establish a detection zone within which it can detect objects. In one embodiment sonar sensors have fields of view between about 45 degrees and 190 degrees, but in other embodiments the cameras can have smaller or larger fields of view. Similarly, in one embodiment sonar sensors 108 can have ranges between 0 and about 5 m (i.e., between 0 and about 20 feet), but in other embodiments the sonar sensors can have smaller or greater ranges.

In an embodiment of system 100 that include both cameras and sonar sensors, the detection zones of the individual cameras and sensors combine to form one or more overall system detection zones. On the passenger side of vehicle 102, the detection zones of camera 104p, sonar sensor 108ps, and sonar sensor 108pf combine to form an overall passenger-side detection zone 202p. Similarly, on the driver side of vehicle 102, the detection zones of camera 104p, sonar sensor 108ps, and sonar sensor 108pf combine to form an overall driver-side detection zone 202d. Although illustrated in the drawing with rectangular shapes for simplicity, the exact shapes of detection zones 202p and 202d will depend on the particular fields of view and ranges of cameras 104 and, if present, sonar sensors 108. In an embodiment that omits sonar sensors 108, the shapes of detection zones 202p and 202d will also be different than shown.

To offer protection against door collisions, detection zones 202p and 202d can overlap or include some or all of the impact zone 105 of at least one door on their respective side of the vehicle. If cameras 104 have a sufficiently large field of view—190 degrees in one embodiment, for instance—then their individual detection zones, and hence the system detection zones 202, can also overlap or include the impact zones of both front and rear doors. As shown in the drawing, then, detection zone 202p includes the impact zones 105 of both front and rear passenger doors, and similarly detection zone 202d includes the impact zones 105 of both front and rear driver-side doors.

Embodiments of system 100 that include sonar sensors 108 extend detection zones 202p and 202d beyond the impact zones 105 of doors on their respective side of the vehicle. Such a detection zone configuration can be useful for detecting approaching objects that are not currently in impact zone 105 of any door but imminently will be in an impact zone—for instance an approaching bicycle.

Figure 3:
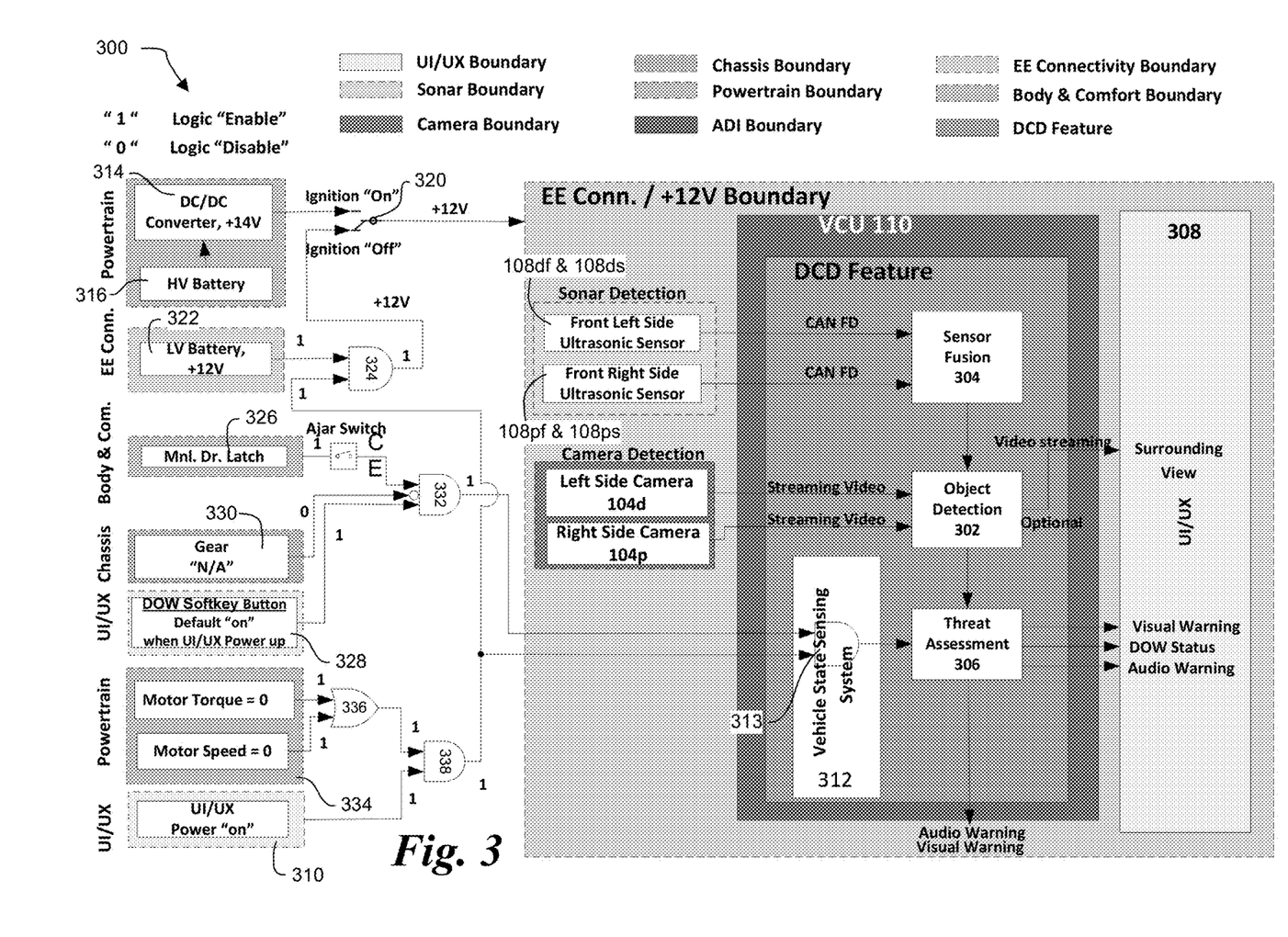
FIG. 3 is a functional block diagram of an embodiment of a DCD/DOW system.

FIG. 3 illustrates details of an embodiment of a door collision detection/door open warning (DCD/DOW) system 300. In DCD/DOW system 300, VCU 110 includes an object detection module 302 communicatively coupled to a sensor fusion module 304 and a threat assessment module 306. A vehicle state sensing system 312 is also communicatively coupled to threat assessment module 306. In some embodiments systems 302, 304, 306, and 312 can be implemented in software—they can, for instance, be separate threads, processes, or services running on one or more processors within VCU 110. In other embodiments these modules can be implemented in hardware, for instance with application-specific integrated circuits (ASICs) that cooperate with the main processor of VCU 110.

A user interface 308 is communicatively coupled to VCU 110, so that VCU 110 can both send data to, and receive data from, the user interface. Among other things, user interface 308 can display the status of the door collision detection/door open warning (DCD/DOW), can provide streaming video of the view surrounding the vehicle, and can provide visual warnings or audio warning of the DCD detects object in a door's impact mile. User interface 308 also includes a soft key button 328 by which an occupant can turn the DCD/DOW system on and off. In other embodiments, user warnings need not be provided by user interface 308, but can instead be provided by other elements. For instance, a simple light or other visual indicator separate from user interface 308 can be used to provide visual warnings, while speakers or other sound transducers separate from the user interface can be used to provide audible warnings. Still other embodiments can provide haptic warnings in addition to or instead of visual and audible warnings, for instance by vibrating or tapping an occupant's seat, vibrating a door handle, etc.

Cameras 104*p* and 104*d* are communicatively coupled to object detection module 302, so that cameras 104 can send data to the object detection module. In the illustrated embodiment, cameras 104*p* and 104*d* send streaming video data to object detection module 302, but in other embodiments other types of data—sequences of still images, for instance—can be send to object detection module 302. In an embodiment with sonar sensors 108, sonar sensors 108*ps*, 108*pf*, 108*ds*, and 108*df* are also communicatively coupled to object detection module 302 so that they can send sonar data to the object detection module. Upon receiving data from the cameras 104*p* and 104*d*, and from sonar sensors 108*ps*, 108*pf*, 108*ds*, and 108*df* if present, object detection module 302 and threat assessment module 306 analyze the received data to determine whether there are objects in any door impact zones 105 that are within detection zones 202*d* or 202*p* (see FIG. 2). If threat assessment module 306 determines that there are objects in any door impact zones, then it can send commands to user interface 308 so that the user interface can provide a visual or audio warning to a vehicle occupant.

Various other features of system 300 control when the DCD/DOW system receives electrical power and operates. System 300 is coupled to elements of the vehicle's powertrain, which includes a high-voltage battery 316, a DC/DC converter 314, and a separate low-voltage battery 322. System 300 is also coupled to a door latch sensor 326, DOW softkey 328 on the user interface 308, vehicle gear 330, motor torque and motor speed sensors 334 in the powertrain, and UI/UX power on switch 310, which controls whether electrical power is supplied to user interface 308.

Ignition switch 320, together with logic implemented by a combination of logic gates, determines how system 300 is supplied with electrical power. The combination of logic gates includes AND gate 324, OR gate 336, and AND gate 338. The inputs of AND gate 324 are coupled to low-voltage battery 322 and to the output of AND gate 338. AND gate 338 has its inputs coupled to the output of OR gate 336 and to the UI/UX power on switch 310. OR gate 336 has its inputs coupled to motor torque and motor speed sensors in powertrain 334. For the logic gates, inputs and outputs can be TRUE (i.e., a logical 1, or enabled) or can be FALSE (i.e., a logical 0, or disabled).

If ignition switch 320 is on, then high voltage battery 316 supplies electrical power to the system through DC/DC converter 314 via ignition switch 320. But if ignition switch 320 is off, then logic gates 324, 336, and 338 determine whether low-voltage battery 322 supplies power to the system. If the motor torque or motor speed are substantially zero, such that either input to OR gate 336 is TRUE, then the output of OR gate 336 is also TRUE. If the output of UI/UX power on 310 is also TRUE, then both inputs to AND gate 338 are true and the output of AND gate 338 is also TRUE. If both inputs of AND gate 324—i.e., the output of low-voltage battery 322 and the output of AND gate 338—are true, then the output of AND gate 324 is true and low-voltage battery 322 supplies electrical power to the system via ignitions switch 320.

With electrical power supplied to the system, whether the DCD/DOW system is active is controlled by logic implemented by AND gate 332, OR gate 336, and AND gate 338. AND gate 332 has its inputs coupled to door latch sensor 326, gear sensor 330, and DOW softkey 328 and has its output coupled to AND gate 313 in vehicle state sensing system 312. OR gate 336 has its inputs coupled to motor torque and motor speed sensors in powertrain 334 and has its output coupled to an input of AND gate 338. AND gate 338 has its inputs coupled to the output of OR gate 336 and to the UI/UX power on switch 310 and has its output coupled to AND gate 324 as well as AND gate 313 within vehicle state sensing system 312; within system 312, AND gate 313 can be implemented in hardware or software.

In operation, if AND gate 332 senses that all three of its inputs are true—i.e., that door latch sensor 326 senses that the door handle is being activated by an occupant, that softkey button 328 has turned on the DCD/DOW system, and that the vehicle's gear 330 has been set to park—then AND gate 332 outputs a TRUE signal to AND gate 313. At the same time, if AND gate 338 senses that both its inputs are TRUE—i.e., that UI/UX power on 310 is active, and that one or both of the motor torque and motor speed in powertrain 334 are substantially zero so that the output of OR gate 336 is also TRUE—then AND gate 338 outputs a TRUE signal to AND gate 313. When both inputs to AND gate 313 are TRUE, then AND gate 313 outputs a signal that activates threat assessment module 306, which then proceeds to work with the other modules to assess the threat of a door collision. If threat assessment module then detects objects in the impact zone (i.e., the threat of a door collision), it can warn the vehicle occupants. In one embodiment, the overall system response time from the time at which a target satisfies the warning requirements to the time that the warning indication is activated can be no more than 300 ms. In other embodiments, activation of a door handle inside the vehicle can be the primary mechanism to activate the DCD/DOW system—i.e., detection and warning can be enabled when a door handle is at open position and disabled when the door handle is in a closed position. Other embodiments can, of course, include logic implemented in hardware (e.g., logic gates) or software that make activation of the detection and/or warning systems dependent on different combinations of the conditions shown and discussed above, or different conditions or combinations of conditions than the ones shown and discussed.

Figure 4:
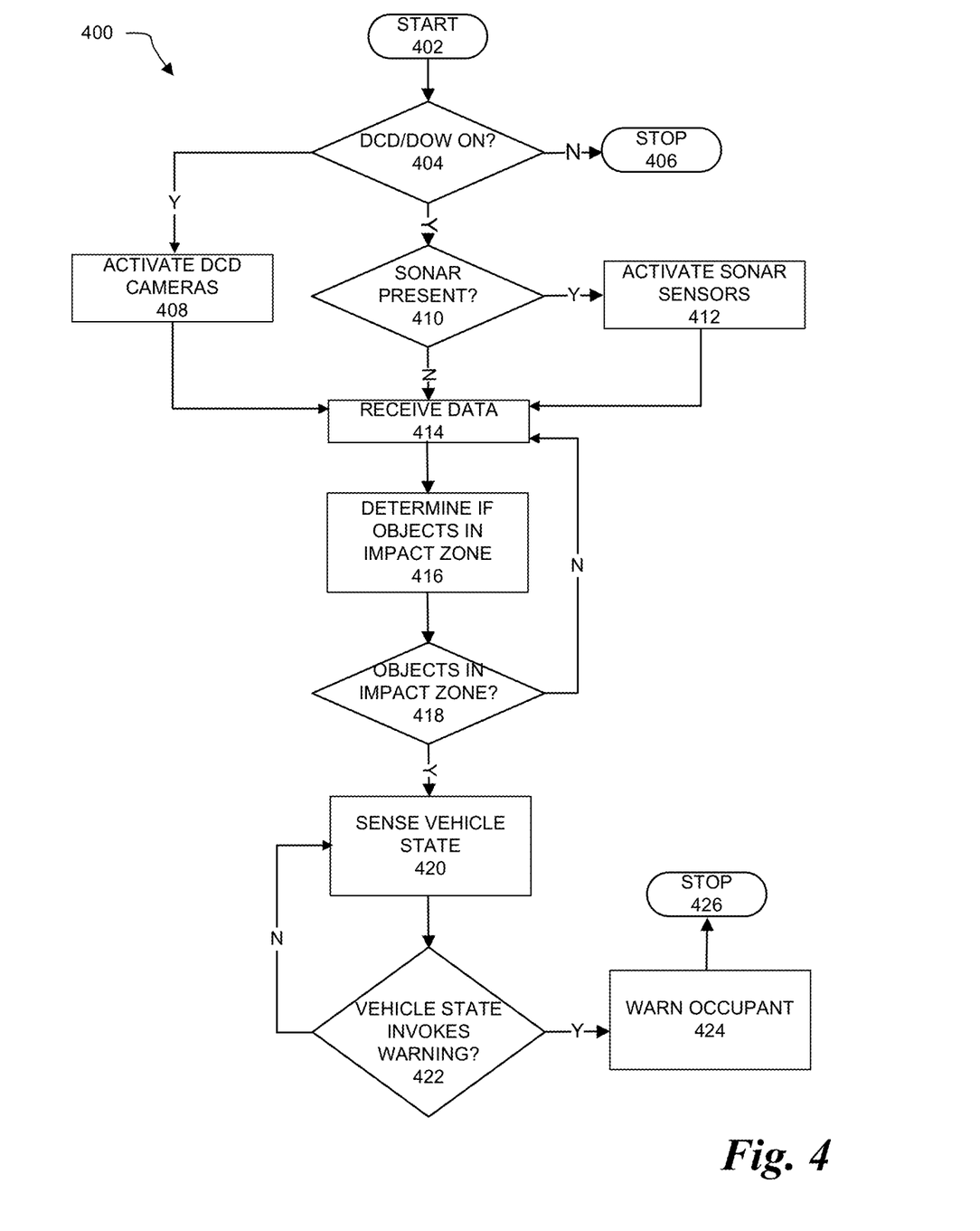
FIG. 4 is a flowchart illustrating an embodiment of a process for using a DCD/DCW system.

FIG. 4 illustrates an embodiment of a process or method 400 by which a DCD/DOW system can operate. The process begins at block 402. At block 404, the process determines whether the DCD/DOW system has been switched on, for instance through a switch or a softkey on a user interface in the vehicle. If at block 404 the DCD/DOW system has not been switched on, then the process stops at block 406. But if at block 404 the DCD/DOW system has been switched on, the process activates the one or more DCD cameras at block 408.

Having activated the DCD cameras at block 408, at block 410 the process checks whether any sonar sensors are present; as discussed above, some embodiments can have the sonar sensors while other embodiments need not have them. If at block 410 the process determines that sonar sensors are present, then at block 412 the sonar sensors are activated. But if at block 410 the process determines that there are no sonar sensors, it proceeds to block 414 where it receives data only from the DCD cameras.

At block 414, the process receives data from the one or more DCD cameras and, if present, from the sonar sensors. At block 416 the process determines, based on the data received at block 414, whether there are objects in the impact zones of the one or more doors to which the DCD cameras are mounts and/or objects about to enter the impact zoned. At block 418 the process checks whether there are objects in the impact zone and/or about to enter the impact zones. If at block 418 the process determines that there are no objects in the impact zone or about to enter the impact zone, then the process returns to block 418, where it continues to receive data. But if at block 418 the process determines that there are objects in the impact zone or about to enter the impact zone, it proceeds to block 420, where it senses the state of the vehicle—including such states as whether the vehicle is in park gear, whether the seat interlock is activated, and whether a door handle is currently being activated.

At block 422, the process checks whether, based on the vehicle state sensed at block 420, a door open warning (DOW) is to be given to an occupant of the vehicle. If at block 422 the process determines that the vehicle state does not invoke a warning, then the process returns to block 420 to reevaluate the vehicle state. But if at block 422 the process determines that the vehicle state does invoke a warning, then at block 424 it warns a vehicle occupant. Having warned an occupant at block 424, the process stops at block 426.

The above description of embodiments is not intended to be exhaustive or to limit the invention to the described forms. Specific embodiments of, and examples for, the invention are described herein for illustrative purposes, but various modifications are possible.

The invention claimed is:

1. An apparatus comprising:
   a computer including at least a processor, memory, and storage;
   a user interface communicatively coupled to the computer;
   one or more door clearance detection sensors communicatively coupled to the computer and adapted to be mounted to an exterior of a corresponding vehicle door, wherein:

each vehicle door has a door impact zone wherein at least one object within the door impact zone would be struck by the vehicle door if opened, and
   each door clearance detection sensor has a field of view and a range, wherein for each door clearance detection sensor the field of view and the range establish a detection zone within which the door clearance detection sensor can collect data, and wherein each detection zone includes at least the corresponding door impact zone;
   a vehicle state sensing system within or coupled to the computer;
   logic comprising instructions stored in the memory or storage, wherein the instructions are executed by the processor if the vehicle state sensing system indicates that a handle that unlatches any of the one or more vehicle doors is being deployed and the instructions cause the processor to:
   receive data from the one or more door clearance detection sensors;
   determine, based on the received data, whether there are any objects in the corresponding door impact zone; and
   warn an occupant of the vehicle via the user interface if it is determined that there are any objects in the door impact zones.

2. The apparatus of claim 1 wherein the one or more door clearance detection sensors include a door clearance detection sensor that can be mounted on a rear view mirror on a driver side of the vehicle and a door clearance detection sensor that can be mounted on a rear view mirror on a passenger side of the vehicle.

3. The apparatus of claim 1 wherein the user interface includes a display to provide a visual warning, a microphone to provide an audible warning, or both.

4. The apparatus of claim 1 wherein the logic further comprises instructions to activate the apparatus only if the vehicle state sensing system indicates that at least one of the following conditions is true:
   the door open warning apparatus has been switched on in the user interface;
   the vehicle is in park gear; and
   the torque or speed of the vehicle's motor is substantially zero.

5. The apparatus of claim 1 wherein each of the one or more door clearance detection sensors is a camera that can collect still or video images.

6. The apparatus of claim 5 wherein each of the one or more door clearance detection cameras is a stereoscopic camera or a time-of-flight camera.

7. The apparatus of claim 1 wherein the field of view of each of the one or more door clearance detection sensor is between 45 degrees and 190 degrees.

8. The apparatus of claim 7 wherein the range of each of the one or more door clearance detection sensor is between 0 and 6 feet.

9. The apparatus of claim 1, further comprising one or more pairs of sonar sensors coupled to the computer, each pair positioned at a front corner of the vehicle so that one sonar sensor of the pair points forward and the other sonar sensor of the pair points sideways.

10. The apparatus of claim 9 wherein the logic further comprises instructions stored in the memory or storage, wherein the instructions, when executed by the processor, cause the processor to:
    receive data from the one or more pairs of sonar sensors;

determine, based on the received sonar data, whether there are any objects in the door impact zone or objects about to enter the door impact zone; and warn an occupant of the vehicle via the user interface if it is determined that there are any objects in the door impact zone or objects about to enter the door impact zone.

11. A system comprising:

a vehicle including at least a driver door and a front passenger door;

a vehicle door opening warning apparatus comprising:
a computer including at least a processor, memory, and storage;
a user interface communicatively coupled to the computer;
a pair of door clearance detection sensors communicatively coupled to the computer, wherein one door clearance detection sensor is mounted to an exterior of the driver door and the other door clearance detection sensor is mounted to an exterior of the front passenger door, wherein:
the driver door and the front passenger door each have a door impact zone, wherein at least one object within the door impact zone would be struck by the corresponding door if opened, and
each door clearance detection sensor has a field of view and a range, wherein for each door clearance detection sensor the field of view and the range establish a detection zone within which the door clearance detection sensor can collect data, and wherein each detection zone includes at least the door impact zone of its corresponding door;
a vehicle state sensing system within or coupled to the computer;
logic comprising instructions stored in the memory or storage, wherein the instructions are executed by the processor if the vehicle state sensing system indicates that a handle that unlatches any of the one or more vehicle doors is being deployed and the instructions cause the processor to:
receive data from the pair of door clearance detection sensors;
determine, based on the received data, whether there are any objects in the door impact zone of the driver door or the door impact zone of the front passenger door; and
warn an occupant of the vehicle via the user interface if it is determined that there are any objects in either door impact zone.

12. The system of claim 11 wherein the door clearance detection sensors are mounted on a rear view mirror on the driver door and on a rear view mirror on the front passenger door.

13. The system of claim 11 wherein the user interface includes a display to provide a visual warning, a microphone to provide an audible warning, or both.

14. The system of claim 11 wherein the logic further comprises instructions to activate the apparatus only if the vehicle state sensing system indicates that at least one of the following conditions is true:
the door open warning apparatus has been switched on in the user interface;
the vehicle is in park gear; and
the torque or speed of the vehicle's motor is substantially zero.

15. The system of claim 11 wherein each of the one or more door clearance detection sensors is a camera that can collect still or video images.

16. The system of claim 15 wherein each of the one or more door clearance detection cameras is a stereoscopic camera or a time-of-flight camera.

17. The system of claim 11 wherein the field of view of each of the one or more door clearance detection sensors is between 45 degrees and 190 degrees.

18. The system of claim 17 wherein the range of each of the one or more door clearance detection sensors is between 0 and 6 feet.

19. The system of claim 11, further comprising one or more pairs of sonar sensors coupled to the computer, each pair positioned at a front corner of the vehicle so that one sonar sensor of the pair points forward and the other sonar sensor of the pair points to the side.

20. The system of claim 19 wherein the logic further comprises instructions stored in the memory or storage, wherein the instructions, when executed by the processor, cause the processor to:
receive data from the one or more pairs of sonar sensors;
determine, based on the received sonar data, whether there are any objects in the door impact zone or about to enter the door impact zone; and
warn an occupant of the vehicle via the user interface if it is determined that there are any objects in the door impact zone or about to enter the door impact zone.

21. A method comprising:
receiving data from one or more door clearance detection sensors mounted on a vehicle door, each door clearance detection sensor having a field of view and a range that establish a detection zone within which the door clearance detection sensor can collect data;
determining, based on the received data, whether there are any objects in one or more door impact zones corresponding to each vehicle door on which a door clearance detection sensor is mounted, wherein the door impact zone is a zone within which at least one object would be struck by the vehicle door if opened and wherein each detection zone includes at least the corresponding door impact zone; and
determining whether a handle that unlatches the vehicle door is being deployed;
warning an occupant of the vehicle if it is determined that the handle that unlatches the vehicle door is being deployed and there are any objects in the one or more door impact zones.

22. The method of claim 21 wherein each of the one or more door clearance detection sensors is a camera that can collect still or video images.

23. The method of claim 21 wherein the field of view of each of the one or more door clearance detection sensors is between 45 degrees and 190 degrees.

24. The method of claim 21 wherein the range of each of the one or more door clearance detection sensors is between 0 and 6 feet.

25. The method of claim 21 wherein the warning is visual warning, an audible warning, or both.

26. The apparatus of claim 21, further comprising:
sensing a vehicle state;
activating the warning only if the vehicle state sensing indicates that at least one of the following conditions is true:
a door open warning apparatus has been switched on,
the vehicle is in park gear, and the torque or speed of the vehicle's motor is substantially zero.

27. The apparatus of claim 21, further comprising:
receiving data from one or more pairs of sonar sensors, each pair positioned at a front corner of the vehicle so that one sonar sensor of the pair points forward and the other sonar sensor of the pair points sideways;
determining, based on the received sonar data, whether there are any objects in the door impact zone or objects about to enter the door impact zone; and
warning an occupant of the vehicle if it is determined that there are any objects in the door impact zone or objects about to enter the door impact zone.

* * * * *